United States Patent [19]

Peterson

[11] Patent Number: 4,705,142

[45] Date of Patent: Nov. 10, 1987

[54] CHAIR LIFT WITH CARRYING CASE FORMING PLATFORM

[76] Inventor: Carl Peterson, 7456 Main St., Niles, Ill. 60648

[21] Appl. No.: 828,531

[22] Filed: Feb. 12, 1986

[51] Int. Cl.[4] .......... A62B 1/00

[52] U.S. Cl. .......... 182/150; 182/151; 182/70; 182/20

[58] Field of Search .......... 182/150, 142, 70, 72, 182/76, 74, 75, 5-7, 20, 151

[56] References Cited

U.S. PATENT DOCUMENTS

| | | | |
|---|---|---|---|
| 187,569 | 2/1877 | Tixier | 182/7 |
| 252,130 | 1/1882 | Newton | 182/72 |
| 289,701 | 12/1883 | Parker | 182/72 |
| 292,548 | 1/1884 | Doren | 182/72 |
| 380,546 | 4/1888 | Brads | 182/142 |
| 484,536 | 10/1892 | Leber | 182/142 |
| 581,197 | 4/1897 | Cook | 182/142 |
| 1,244,278 | 10/1917 | Astarita | 182/7 |
| 1,369,139 | 2/1921 | Sperry | 244/151 R |
| 1,472,203 | 10/1923 | Bassett | 182/72 |
| 2,855,028 | 10/1958 | Mathews | 182/73 |

*Primary Examiner*—Reinaldo P. Machado
*Assistant Examiner*—Alvin Chin-Shue
*Attorney, Agent, or Firm*—Paul H. Gallagher

[57] ABSTRACT

A box serves as a seat, and as a container for holding all of the rigging used in suspending the seat. The box has a closure panel for confining the rigging, and it is suspended with the bottom side up to form a seat. The seat is supported by ropes, including two rope members, each a single rope element doubled to form single strands to secure to the seat, and a loop at the top to form a lifting eye. A spreader bar is positioned between the rope members, and is adjustable in length. The box has lift eyes thereon for securement of the ropes. The seat includes alternative means for securement of the ropes, including through rods to which the ropes are secured. The device also includes a boatswain's safety belt as an alternative suspending means. Additionally it includes a safety harness for confining an infirm rider.

14 Claims, 25 Drawing Figures

FIG. 1
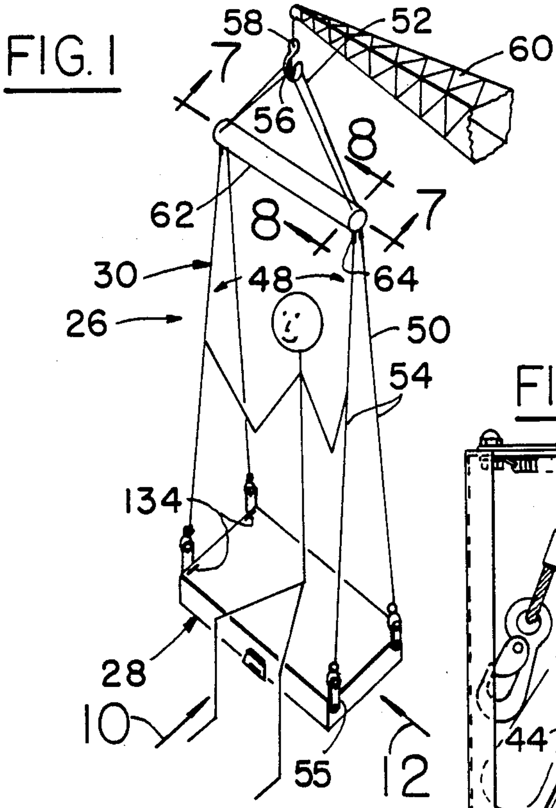
FIG. 2
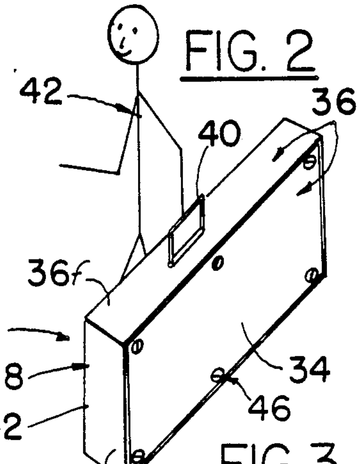
FIG. 4
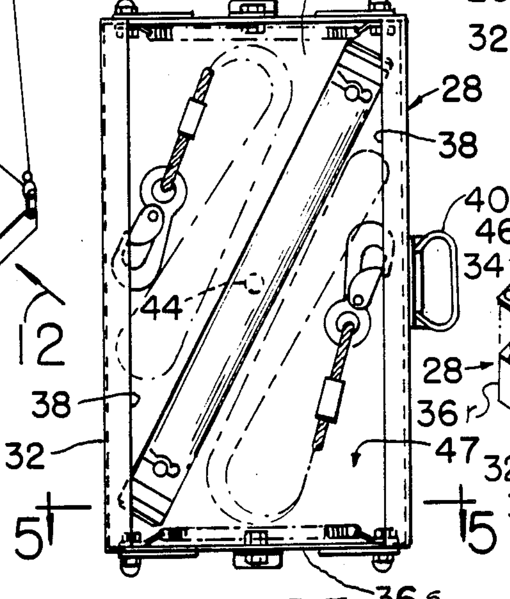
FIG. 3
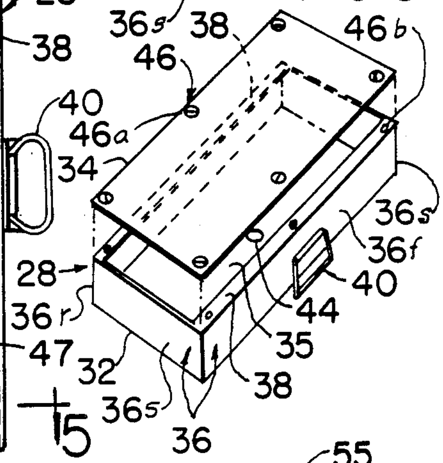
FIG. 5
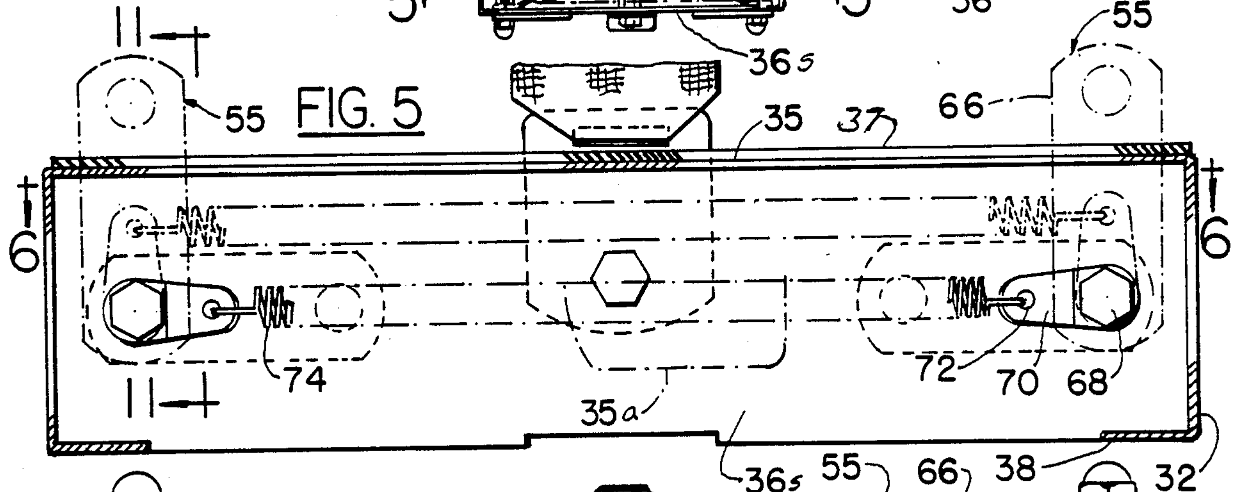
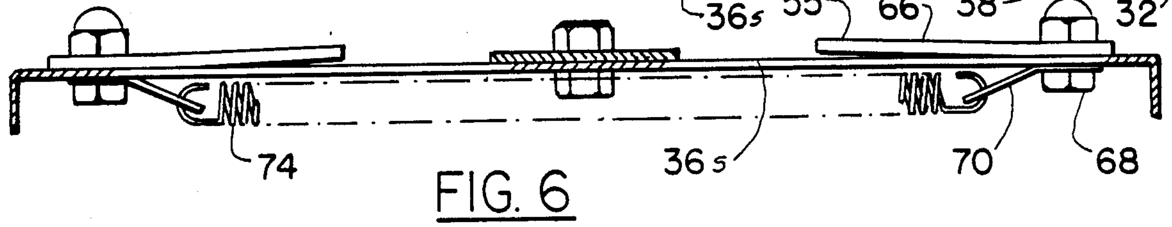
FIG. 6

FIG. 15
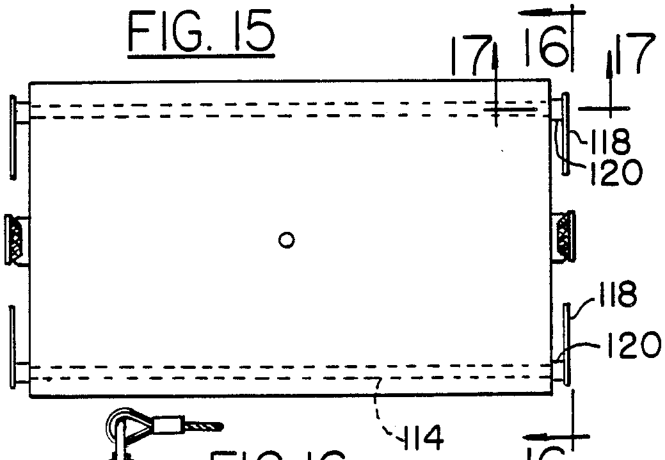
FIG. 17
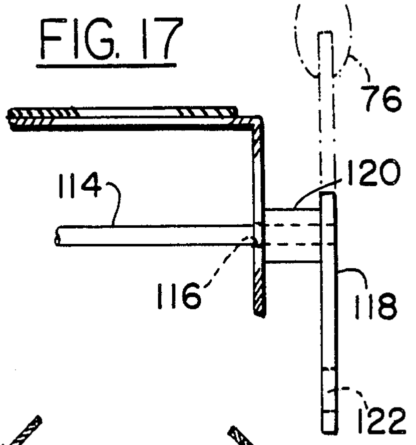
FIG. 16
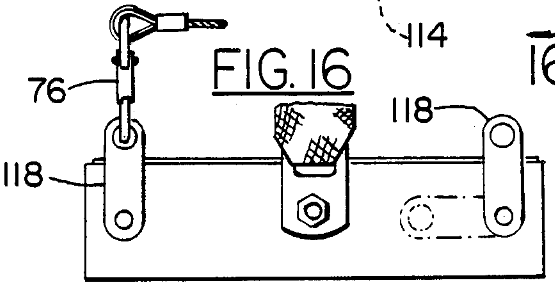
FIG. 19
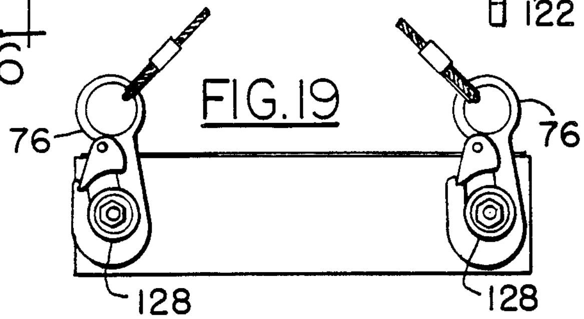
FIG. 18
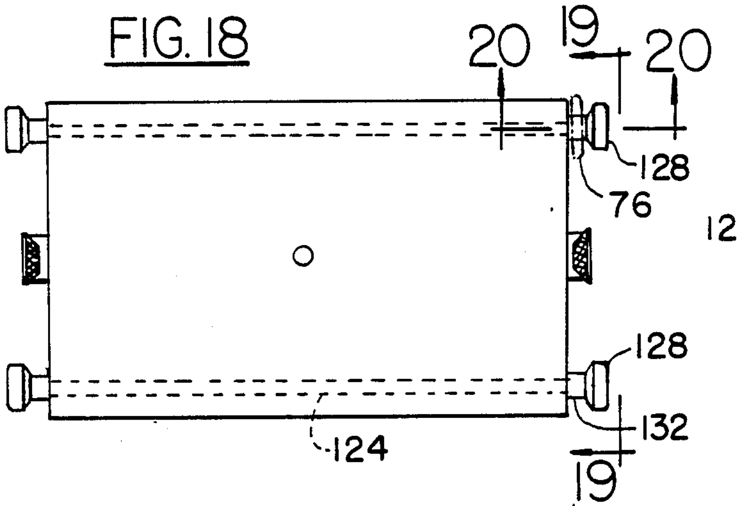
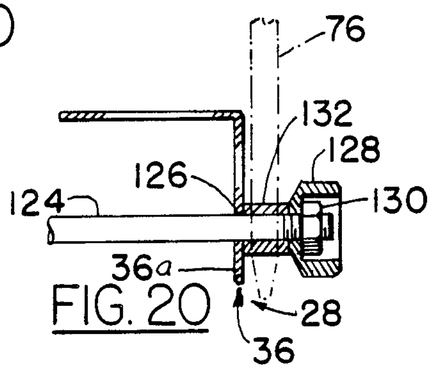
FIG. 20
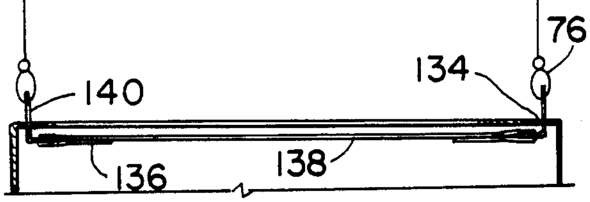
FIG. 22
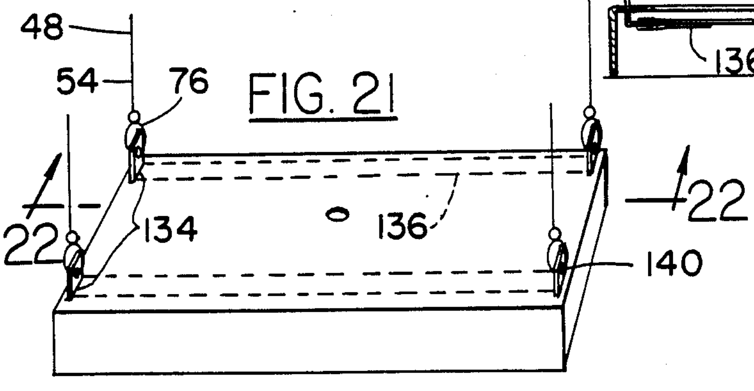
FIG. 21

CHAIR LIFT WITH CARRYING CASE FORMING PLATFORM

FIELD OF THE INVENTION

The invention resides in the field of chair lifts of the kind wherein a seat is suspended by a system of ropes or cables, the ropes being provided at the top with an eye for hooking it onto a crane for carrying a person seated on the seat to various locations. The device is used for example in construction work, in repair of buildings, in diving activities, etc.

OBJECTS OF THE INVENTION

A broad object of the invention is to provide a chair lift of the foregoing character, which incorporates a container that serves as a platform for the user, and as a carrying case in which the remaining parts can be packed, and thereby utilized for easily carrying the device in the hand.

Another object is to provide a chair lift of the foregoing character having the following features and advantages:

1. An unusual arrangement of ropes provides unusual strength for a minimum number of rope elements.

2. A telescopic spreader bar enables holding the ropes at different spacings.

3. The platform includes novel construction, and the device includes novel hardware for use with the container/platform, providing convenience and a high degree of safety.

4. An arrangement is provided for stabilizing the platform, for use in cases where the user is in standing position.

5. The container/platform includes a handle for carrying, that also may be used for anchoring the platform relative to a job on which the user is working.

6. The container/platform is of such design and construction as to enable the selective use of any of a variety of means for mounting it on the ropes, from the standpoint of safety.

DESCRIPTION OF CERTAIN PREFERRED EMBODIMENTS

In the drawings,

FIG. 1 is a perspective view of the chair lift of the invention, shown supported and suspended by a crane.

FIG. 2 shows the chair lift folded away, showing only the box, which constitutes the container, or the platform, according to its condition.

FIG. 3 is a perspective view of the box, showing the two main components thereof, namely, the body and a closure element.

FIG. 4 is a view of the body of the box, with the closure element removed and showing the rigging of the chair lift therein.

FIG. 5 is a large scale sectional view taken at line 5—5 of FIG. 4.

FIG. 6 is a sectional view taken at line 6—6 of FIG. 5.

FIG. 15 is a plan view of a platform showing modified form of mounting means.

FIG. 16 is an end view taken at line 16—16 of FIG. 15.

FIG. 17 is a large scale sectional view taken at line 17—17 of FIG. 15.

FIG. 18 is a view similar to FIG. 15 and showing a platform with another modified form of suspension means.

FIG. 19 is an end view taken at line 19—19 of FIG. 18.

FIG. 20 is a large scale sectional view taken at line 20—20 of FIG. 18.

FIG. 21 is a perspective view of the platform with a modified form of mounting means.

FIG. 22 is a view taken at line 22—22 of FIG. 21.

Figure 7:
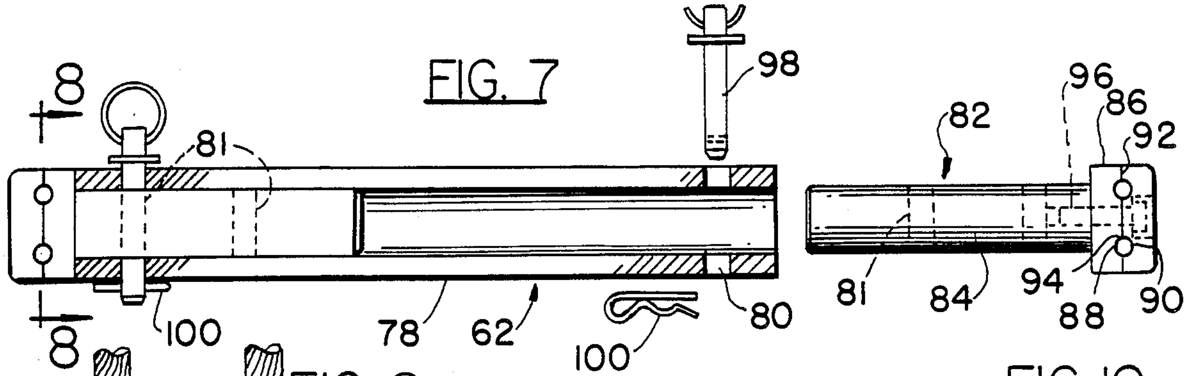
FIG. 7 is a view of the spreader arm, partially in section.

Referring to the invention in general, the broad concept incorporates a chair lift that includes all of the features and advantages of chair lifts heretofore known, with the additional advantage that one of the components serves as a container for the remaining components. Specifically the container serves as the platform of the chair lift. The chair lift includes rigging for supporting and suspending the platform, when in use, and when it is not in use, the rigging is packed into the container, in which it is completely confined, and the container appears as a box. The box includes a main body having an open side, and a closure element, which serves as a cover when the box is used as a container.

Referring in detail to the drawings, the chair lift in its entirety is indicated at 26 and includes a platform 28 and rigging 30. The component 28 may also be referred to as a container, or a box, as well as a platform, since that item is used for carrying the rigging, and the entire chair lift can thereby be self-contained in a carrying condition.

The component or box 28 includes a body 32 and a closure element 34 which when the entire chair lift is packed, serves as a cover or lid to the body 32, for putting it in carrying condition and as shown in FIG. 2.

The body 32 and the closure element 34 may be made of strong steel, preferably stainless steel, or fiberglass or other desired materials and the body 32 includes a panel or element 35, surrounding wall elements 36 which for convenience will be referred to as including a front element **36*f*, a rear element 36*r*, and side elements 36*s*. The element 35 serves as a bottom to the box, when the box is used as a container, as positioned in FIG. 3, and serves as a seat element when the box is positioned as a platform as in FIG. 1. Such terms may be used interchangeably, and are used herein according to the position of the component in serving the corresponding function. The element 35 is provided with a mat 37, of plastic or rubber-like material, or similar material, providing a relatively high friction surface. Preferably inturned flanges 38 are formed on the extended edges of the front and rear wall elements 36*f*, 36*r*. The body 32 is prefereably a single integral piece, folded and welded at the butting edges of the elements, including the ends of the flanges 38**.

The shape and proportions of the container or platform may be as desired, preferably elongated in transverse direction according to its position of use, the side elements **36*s*** therefore extending across the short ends.

The body 32 is provided with a carrying handle 40 for grasping by the user 42 (FIG. 2), and for use in tying the device (FIG. 14) to an object forming the job being worked on as will be referred to again hereinbelow.

Figure 12:
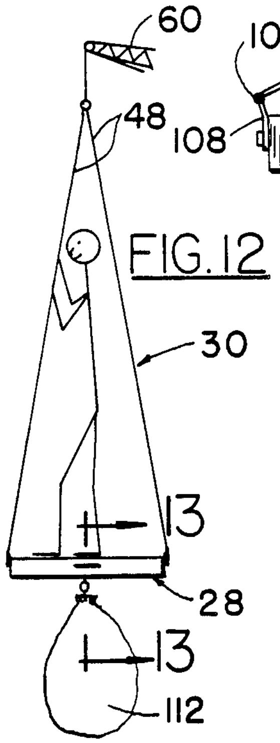
FIG. 12 is a small scale, semi-diagrammatic, side view oriented according to the arrow 12 in FIG. 1 and incorporating a weight therein.
Figure 13:
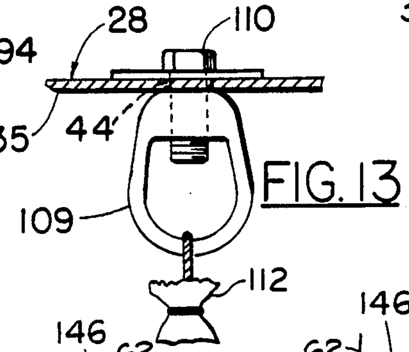
FIG. 13 is a large scale sectional view taken at line 13—13 of FIG. 12.

The bottom element of seat element 35 is provided with an aperture 44 (FIGS. 3, 4, 13) for securing a weight thereto as referred to hereinbelow in connection with FIGS. 12 and 13.

The closure element 34 and the body 32 are provided with suitable securing means 46 of known kind, including elements **46*a* in the closure element and 46*b* in the flange 38 for securing the closure element to the body, for forming a closure thereof when the component is used as a container. These locking means are quick-acting, and the components 46*a*** may be left in the cover and are held therein, against loss.

The body 32 is thus provided with an open side 47 for placing the rigging in the container and removing it therefrom.

The rigging, indicated in its entirety at 30, includes a pair of rope members 48, each including a single rope element 50 that is doubled, forming a loop or bight 52, and a pair of legs 54 the free ends of which are connected to the platform by means of lift eyes in a manner referred to again hereinbelow.

The two loops 52 are fitted together to form a single eye 56 for receiving a lifting hook 58 on a crane 60. As will be understood, the crane is utilized for carrying the lift chair, with the user occupying it, to the location where the work is to be done.

A spreader bar 62 is fitted between the rope members 48, adjacent the top of the rope members, for retaining them at or adjacent vertical positions, and to enable the user to stand on the platform. The rope elements 54 are provided with knobs or enlargements 64 forming stop means for holding the spreader bar in its intended elevated position, as will be referred to again hereinbelow.

The design and arrangement of the rope members 48 constitute a novel feature of the invention. Each rope member, as indicated above, is a single rope element 50 and the portions thereof above the spreader bar that form the loop 52 provide in effect a double strength rope, while the legs 54 are single ropes, but together providing the same strength as the loop 52. Heretofore it has been necessary to provide extra strength members corresponding to the loops 52, separate from the legs 54 or single rope elements.

Attention is directed to FIGS. 5 and 6 showing the lift eyes 55 and related elements. The lift eyes 55 are each in the form of an elongated lever 66 pivotally mounted in the end wall elements **36*s* by a bolt 68 threaded through the element 66 and the end wall element, and another lug 70 having an aperture 72 therein. The lug 70 and lift eye 66 are both fixed on the bolt and swing therewith upon rotation of either. The lugs 70 are interconnected by a tension spring 74 which normally holds the lugs 70 in lower position, directed toward each other, i.e. horizontal position, shown in dotted lines. When the carrying case/platform is not in use, the lift eyes 66 are held in that position, and thus within the transverse projection of the carrying case, for convenience in carrying the device. As an alternative arrangement, instead of using the springs 74**, the lift eyes may be releasably secured in lowered position, being released from that position when the ropes are connected to them.

Figure 11:
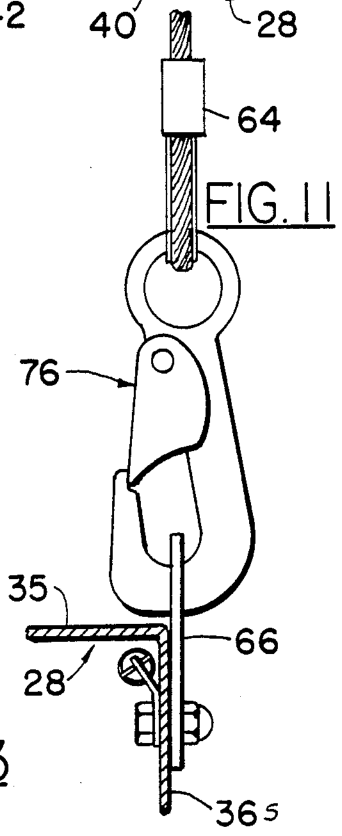
FIG. 11 is a view taken at line 11—11 of FIG. 5 and showing a rope element connected to the platform.

The legs 54 of the rope members are provided with suitable snaps 76 (see FIG. 11), of known kind, and to secure the rope members to the platform, or to mount and suspend the platform from the rope members, these snaps are merely quick-snapped into the lift eyes 66.

Figure 8:
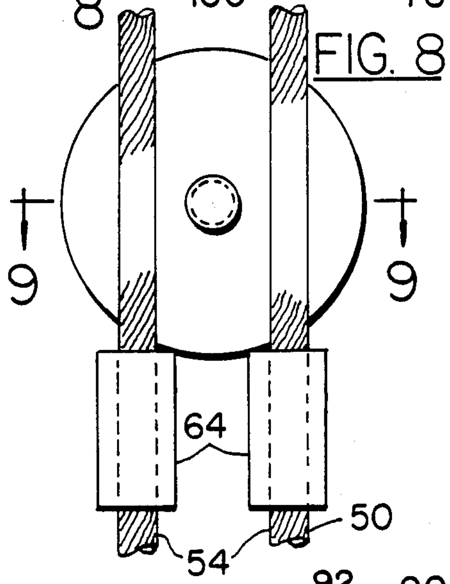
FIG. 8 is a view taken at line 8—8 of FIG. 7 and showing rope elements in place therein.
Figure 9:
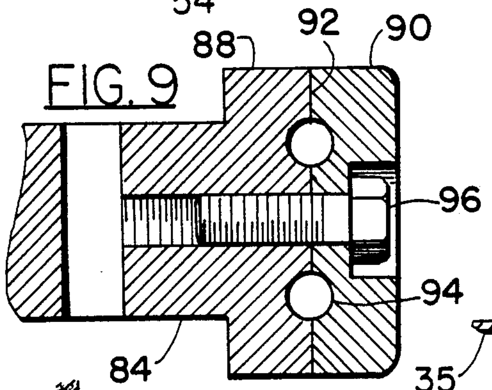
FIG. 9 is a sectional view taken at line 9—9 of FIG. 8.

The spreader bar 62 is of telescopic construction, to adjust to different lengths for spreading the rope members at different distances apart. Attention is directed to FIGS. 7–9 where the spreader bar is shown as having a central body or main portion 78, in the form of a cylindrical tube. The tube has a pair of aligned holes 80 at each end, and mounted in the ends of the tube 78 are clamps 82, each including a shank 84 and a knob 86 at one end. The knob 86 is made up of two parts, an inner part 88 and an outer part 90, on opposite sides of a transverse parting plane 92. The parts 88, 90 are formed with half-holes which together form holes 94, and a threaded bolt 96 is extended through the parts and threaded into a tapped hole in the shank 84. The clamps 82 are mounted on the tubular body 78 by inserting the shank 84 into the tube and inserting a locking pin 98 through the holes 80 and aligned holes 81 in the shank 84 and a cotter pin 100 is fitted in an aperture in the extended end of the pin. A pair of spaced holes 81 are formed in each shank 84 for providing corresponding positions of the clamps and adjustable lengths of the spreader bar. To mount the spreader bar on the rope members, the bolt 96 is backed out, and the parts 88, 90 spread apart and the individual rope strands are fitted in the holes 94, and the bolt 96 threaded in and tightened. The knobs 64 are of course larger than the holes 94 and they thereby retain the spreader bar in its desired elevated position.

The rigging 30 is easily packed away in the carrying case/platform, as represented in FIG. 4. The end clamps 86 are removed from the tubes 78 by first removing the pins 98, the pins being again reinserted to hold the pins in place. The tube is then fitted in the body 32 of the carrying case, which constitutes an open top box. The dimensions are such that this tube will easily fit therein in diagonal position, as indicated. The two rope members 48, with the clamps 82 still secured thereto, can be folded and fitted in place beside the tube 78. Then the closure element 34 is secured in place, covering and closing the body or box 32. The entire unit can then be easily carried as illustrated in FIG. 2.

Figure 10:
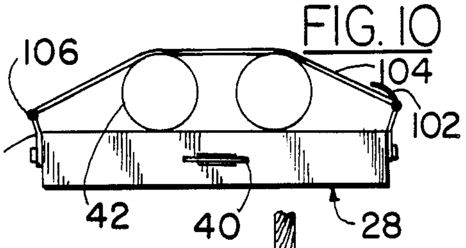
FIG. 10 is a fragmentary view oriented according to the arrow 10 of FIG. 1 and showing only the platform thereof and the safety belt.

The device is provided with a safety strap 102 which includes a flexible strap main member 104 (FIG. 10) having clips 106 detachably secured to brackets 108. Preferably these brackets 108 are pivotally mounted on the end wall elements **36*s* (FIG. 5) and assume an upper position when the safety strap is connected, extending above the seat element 35, and they can be swung down to horizontal position as shown at 35*a* when not in use, within the projection of the carrying case. FIG. 10** indicates the user or occupier at 42 with the safety strap extended over his legs.

Occasions occur where it is not practical or possible for the user to perform his function in a sitting position, such as in a caisson, or a small-diameter tube, and in such case he assumes a standing position. In such a standing position the chair lift is especially unstable, and to overcome such instability, a weight is utilized. For this purpose a mounting loop 109 (FIG. 13) is secured to the platform by means of a bolt 110 fitted through the aperture 44 (FIGS. 3, 4) in the seat element of the platform, at the center of the latter. A weight 112, which may be merely a bag of sand or rocks is hung from the loop, which stabilizes the platform for the standing user.

Figure 14:
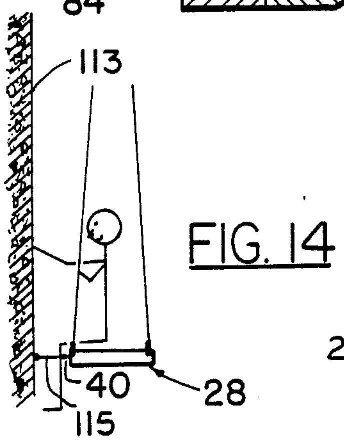
FIG. 14 is a view oriented according to FIG. 12 showing the lower portion of the chair lift in association with a work job with which it is used.

FIG. 14 illustrates the use of the carrying handle 40 in another use. In the case, for example, of a user working on an object 113, a tie 115 is tied to the carrying handle 40 and to the object 113, to hold the chair lift up to the object.

Another form of mounting means is illustrated in FIGS. 15–17. Instead of the lift eyes 66 mounted individually on the platform, as referred to above, through rods 114 are utilized. These rods 114 extend through apertures 116 in the side wall elements 36s, both extending the entire width, or transverse direction, of the platform. At the outer ends of the rods, outwardly of the wall elements, are lift eyes 118 having hubs 120 thereon, by which they are mounted on the rod. The lift eyes 118 have apertures 122 into which the snaps 76 are snapped. The lift eyes 118 are swingable to a lower position, shown in dot-dash lines in FIG. 16, and an upper active position shown in full lines in that figure. The present arrangement, with the through rods, provides added security of mounting the platform on the rope members.

FIGS. 18–20 show still another arrangement for mounting or suspending the platform on the rope member. In the present case through rods 124 are utilized, extending through apertures 126 in the wall elements 36a. Mounted on the outer ends of the through rods are enlarged knobs or buttons 128 held thereon by nuts 130, and spacers 132 are interposed between the knobs and the wall elements 36a, acting as hubs, and the platform thereby mounted on or suspended from the rope members, the snaps being so dimensioned that they can not slide over the knob.

The invention is of such scope as to include a chair lift similar to what has long been known as a boatswain's chair, in which safety straps are incorporated and arranged so that if other elements should fail, the safety straps would remain safe. For this purpose the seat element 35 is provided with slots 134 (FIGS. 1, 21, 22) and the safety straps 136 referred to, shown, each having a main portion 138 of webbing provided with lifting eyes 140 at the ends thereof, which are extended through the slots 132, and then the snaps 76 on the rope elements 54 are snapped into these lifting eyes. In this case the entire component, i.e. the platform, is utilized for the user to sit on, but if anything should happen to the platform, the safety straps 136 will sustain the user, in the manner of boatswain's chairs heretofore known, to the satisfaction of older and experienced users accustomed to such kinds of chair lifts.

The embodiments shown in 15–17, 18–20, 21–22, are considered alternatives, but they may be supplied with the chair lift as a whole, together with the fittings and hardware shown in the first embodiment illustrated in FIGS. 1–11, but if desired, the elements utilized in these modifications may also be designed and dimensioned for fitting in the carrying case/platform.

Figure 23:
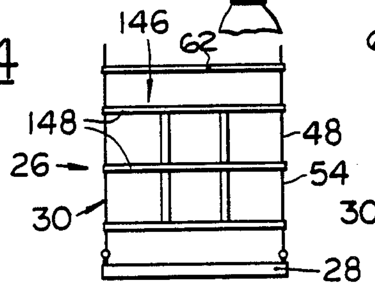
FIG. 23 is a front or back elevational view of the chair lift with a safety harness with the harnessin lower active position.
Figure 24:
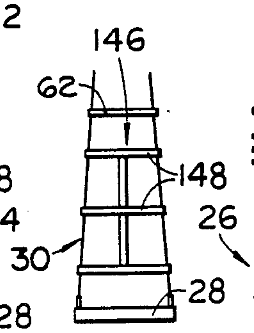
FIG. 24 is a side view of the device of FIG. 23.
Figure 25:
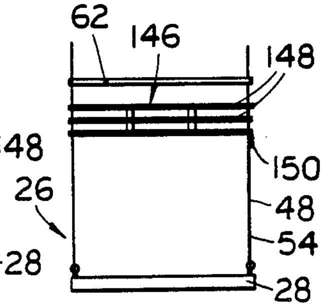
FIG. 25 is a view oriented according to FIG. 23 with the safety harness in upper inactive position.

The device also includes means to confine a person who is infirm and in danger of falling off of the seat, such as an accident victim, a semi-conscious or comatose person, or a fearful person. In such cases, the chair may be carried by a crane of a helicopter to rescue the persons. FIGS. 23–25 show such a means. This means includes a safety webbing or harness 146 which contains straps 148 mounted on the rope members 48 and surrounding the four legs 54 thereof. It is slidable on the rope members between a lower active position of FIGS. 23, 24, and an upper inactive position of FIG. 25. It is releasably held in upper position by suitable manually manipulatable clips 150, and may be retained in its lower position by friction. In its lower position it effectively surrounds the rider, or patient seated on the platform and prevents him from falling off.

I claim:

1. A chair lift comprising, a rigid box having a carrying handle serving alternatively as a portable container and as a platform, and including a rigid body having a panel forming a bottom of the box and with the outer surface of the bottom being used as a seat of the platform, the body also having surrounding side walls and an open side opposite said panel, the box acting as a container being adapted to receive nearly all the other elements of the chair lift, and including a rigid closure element detachably mountable on the body over the open side thereof, the box, with the closure element secured to the body, forming a complete enclosure entirely enclosing the other elements when in place therein, a pair of rope members each including a loop and a pair of legs having free ends, the free ends of the legs being detachably secured to the box when the box serves as a platform, the free ends of the legs being lowermost and the loops being uppermost, and the loops being positionable relative to each other to form a single loop to mount the chair lift on and suspend it from a lifting hook, and the chair lift further including a spreader bar between the rope members.

2. A chair lift according to claim 1 wherein, each rope member is a single rope doubled to form said loop, and said legs extend from the loop.

3. A chair lift according to claim 1 and including, through rods extending transversely through the box and extending through and outwardly of the surrounding side walls, with conformations in their extended outer ends forming lift eyes by which the box is mounted on the rope members.

4. A chair lift according to claim 1 and including, through rods extending transversely through the box and extending outwardly of the surrounding side walls, and having enlargements on their ends, enabling snap means on the rope members to be snapped onto the through rods, inwardly of the enlargements, and the enlargements thereby retaining the snap means on the through rods.

5. A chair lift according to claim 1 wherein, the carrying handle is mounted on one of said surrounding side walls, for manually carrying the box as a container, the box, when the panel forms a seat, being so positioned with said one side wall and said carrying handle thereon being located laterally, and the handle being thereby adapted for securement to an object to hold the box as a platform, adjacent the object.

6. A chair lift according to claim 1 and including, boatswain's safety straps, said panel of the box having slots adjacent the corners of the box, each boatswain's safety strap including a main portion of flexible webbing with clips at the ends forming lift eyes, the main portion being positionable under the panel, in the interior of the box, with the lift eyes extending through the slots in position for connection of the rope members thereto.

7. A chair lift according to claim 1 and including, means adjacent the panel, when the panel forms a seat, for supporting a weight to stabilize the platform when the user is in standing position thereon and the platform is suspended.

8. A chair lift according to claim 1 and including, a safety harness mounted on the rope members and positioned for surrounding a rider seated on said platform, the safety harness being slidable on the rope members between a lower active position in which it surrounds a rider seated on the plateform, and an upper active position above the rider so seated.

9. A chair lift according to claim 1 wherein, said spreader bar is connected adjacent its ends with the rope members, and is adjustable in length for adjustably spreading said rope members apart.

10. A chair lift according to claim 9 wherein, the spreader bar includes a tubular body and clamps in the ends thereof, the clamps having direct connection with the rope members, and the clamps are adjustable in and longitudinally relative to the body, and thereby providing the adjustability in length of the spreader bar.

11. A chair lift according to claim 10 wherein, each clamp includes separable parts, between which they form holes for receiving the legs of the corresponding rope members, and the legs of the rope members have enlargements forming stop means holding the spreader bar from sliding downwardly on the legs of the rope members.

12. A chair lift according to claim 1 wherein, the box has a transverse direction relative to the seat thereof, and the box includes lifting eyes on the transversely opposite sides of the seat, and pivoted on the corresponding surrounding side walls, and swingable between a retracted position in which they are positioned within the transverse projection of the box and an extended position in which they extend beyond that projection, the extended ends being capable of releasable connection with the legs of the rope members, by which the box is mounted on the rope members, and the box includes means yieldingly moving the lifting eyes to their said retracted position.

13. A chair lift according to claim 6 and including, a safety belt, including means detachably securing the ends thereof on the transverse opposite sides of the seat.

14. A chair lift according to claim 13 wherein, the through rods are rockable about their longitudinal axes to position the lift selectively within the transverse projection of the box, and upwardly of said seat relative to the positioning of the box as a platform.

* * * * *